(12) United States Patent
Bareis

(10) Patent No.: US 6,892,849 B2
(45) Date of Patent: May 17, 2005

(54) STEERING SYSTEM FOR MOTOR VEHICLES

(75) Inventor: Helmut Bareis, Eschach (DE)

(73) Assignee: ZF Lenksysteme GmbH, Schwaebisch Gmuend (DE)

(*) Notice: Subject to any disclaimer, the term of this patent is extended or adjusted under 35 U.S.C. 154(b) by 86 days.

(21) Appl. No.: 10/471,525

(22) PCT Filed: May 18, 2002

(86) PCT No.: PCT/EP02/05527
§ 371 (c)(1),
(2), (4) Date: Nov. 18, 2003

(87) PCT Pub. No.: WO02/096741
PCT Pub. Date: Dec. 5, 2002

(65) Prior Publication Data
US 2004/0108676 A1 Jun. 10, 2004

(30) Foreign Application Priority Data
May 31, 2001 (DE) .......................................... 101 26 423

(51) Int. Cl.⁷ .............................................. B62D 5/04
(52) U.S. Cl. ....................................................... 180/444
(58) Field of Search ................................. 180/443, 444, 180/446, 421, 422; 701/41, 42

(56) References Cited

U.S. PATENT DOCUMENTS 4,956,590 A * 9/1990 Phillips ....................... 318/432

FOREIGN PATENT DOCUMENTS

| DE | 3703591 A1 * | 8/1988 | ........... B62D/15/02 |
| DE | 197 52 346 | 6/1998 | |
| DE | 197 03 903 | 8/1998 | |
| EP | 0 153 805 | 9/1985 | |
| EP | 0 856 720 | 8/1998 | |

* cited by examiner

Primary Examiner—Kevin Hurley
(74) Attorney, Agent, or Firm—Jordan and Hamburg LLP

(57) ABSTRACT

The invention relates to a steering system for motor vehicles, in which the steering spindle part, lying in the steering mechanism housing, is clamped axially in the same end region of the steering spindle part, in which the steering angle sensor unit for sensing the rotational angle or changes in the rotational angle is also provided.

10 Claims, 1 Drawing Sheet

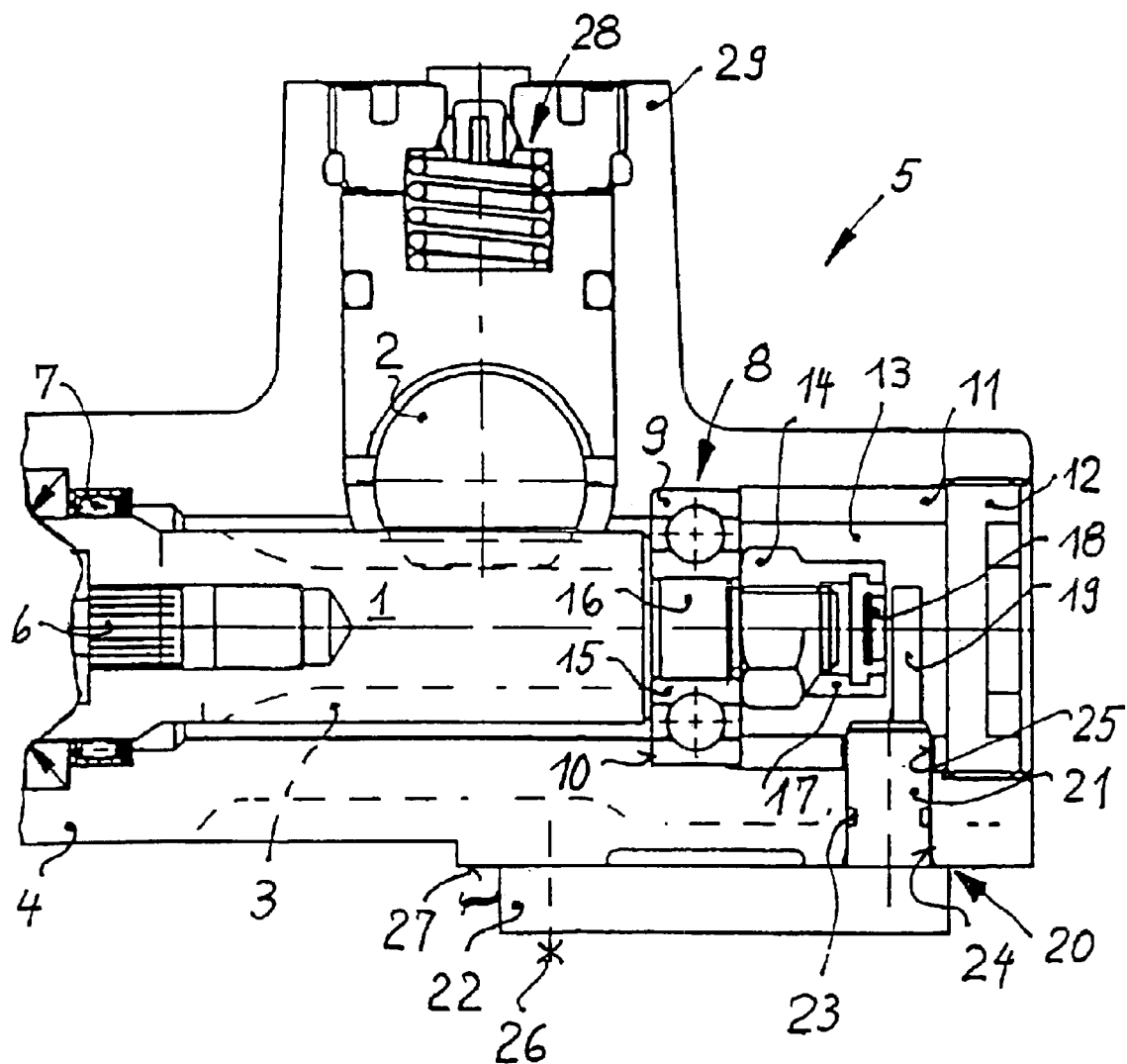

STEERING SYSTEM FOR MOTOR VEHICLES

The invention relates to a steering system for motor vehicles, in particular a rack and pinion steering system for automobiles.

Steering systems of the abovementioned type are known from DE 197 03 903 A1. In these known steering systems, a steering wheel as provided as steering input means for the driver, and the steering commands input by the driver are transmitted via a steering mechanism, having a steering spindle part configured as a pinion, to steering linkages which lead to the wheels to be steered and are connected to the rack which meshes with the pinion. The steering spindle part, which is part of the steering mechanism and is mounted in the steering mechanism housing, is connected to the steering wheel mechanically in the known solution. The steering spindle part, which comprises the pinion, is mounted in the steering housing on both sides of the pinion, the input-side mounting being formed by a roller bearing which axially supports the steering spindle part and is fixed in position relative to the steering mechanism housing by a clamping body which can be screwed in relative to said steering mechanism housing. At the opposite end from the axially supporting mounting, the steering spindle part which forms the pinion ends in a closed space of the mechanism housing and bears a permanent magnet, to which permanent magnet a stationary sensor which is sensitive to magnetic fields is assigned on the outside of the housing, said sensor being protected and held by a sensor carrier which can be plugged onto the steering mechanism housing in the manner of a cover.

The location of the steering angle sensor unit and the axial support of the steering spindle part, which is held in the steering mechanism housing, at opposite ends of the steering mechanism housing restricts the constructional possibilities, in particular also with regard to as compact as possible a construction of the steering mechanism, and can be disadvantageous even in terms of installation and cost considerations.

Furthermore, it is known in practise to fix rack and pinion steering systems in position in the steering mechanism housing at its end which lies opposite the input side, relative to the spindle part located in said steering mechanism housing, by means of a roller mounting which is clamped in axially.

The invention is based on the object of configuring a steering system for motor vehicles of the type mentioned in the introduction, such that the result is a particularly simple and inexpensive construction, which is distinguished by advantageous possible ways of being connected to the steering input means, in particular also in conjunction with steering systems which operate using electric power assistance or using electric transmission (steer by wire) of the commands which are imparted by the driver via the steering input means.

A steering system in accordance with the invention is configured in accordance with the features of claim 1 and distinguished by the fact that the radially and axially guiding roller mounting and the steering angle sensor unit for detecting the rotational angle or changes in the rotational angle at the steering wheel (as steering input means) are assigned to the same end, namely that end of the steering mechanism housing which is remote from the steering input means, this solution being combined with the steering angle sensor being held and inserted radially with respect to the mounting, which permits a shorter construction and also provides favorable preconditions for integrating the permanent magnet into elements which are already present. In particular, a solution of this type can also have advantages with regard to varying the installation positions of the sensor unit, as the accessibility of the sensor, which is the more critical part of the steering shaft sensor unit in terms of maintenance considerations, is not governed by the axial accessibility of the steering mechanism, which proves to be advantageous as the possibilities of varying the positioning of the steering mechanism, and the spatial conditions in relation to this, are frequently critical.

In conjunction with the axial clamping in of the roller bearing, which takes place according to the invention in a simple way by means of a spacer sleeve in conjunction with a clamping body, said clamping body preferably being configured as a cover part and therefore at the same time sealing and closing off the end of the steering mechanism housing axially, it is possible to configure the steering mechanism housing to be open at both ends, preferably in the axial direction, which is advantageous for production, and the steering spindle part, lying in the housing, is clamped simply with respect to the inner ring of the roller bearing, the latter being clamped axially with respect to the housing by means of the outer ring, the corresponding screw connection being possible using the open end of the steering mechanism housing, said screw connection being closed by the cover. Optionally, the steering spindle part, lying in the steering mechanism housing, can be inserted into the steering housing in a preassembled state together with the bearing, and it is subsequently possible to clamp in the bearing by means of the spacer sleeve and the cover part. In conjunction with the screw connection of the steering spindle part with respect to the inner ring of the axially supporting bearing, it proves expedient to configure the corresponding threaded nut with a necklike extension, approximately comparable with a castle nut, and to configure the necklike extension as a holder for the permanent magnet, so that special fastening means are obviated.

In conjunction with such a refinement, it is possible for the associated sensor to be configured as the end of the corresponding holding space, given a flat configuration between the permanent magnets and the cover, it being intended for the sensor carrier to be inserted laterally and it being possible for the spacer sleeve to pass through in a leadthrough which can have large tolerances, with simultaneous guidance and sealing between the sensor carrier and the radial holding bore for the sensor carrier in the steering mechanism housing. This pinlike part of the sensor carrier is expediently coupled to a base plate, which can also simultaneously serve as a carrier for the electronic switching and evaluation units of the sensor unit and can be fixed in position in a simple manner relative to a supporting surface of the steering mechanism housing, so that simple installation conditions result and the sensor unit can also optionally be replaced in its entirety without difficulties.

In order to make installation easier, it can be of advantage, furthermore, to fix the spacer sleeve in terms of its rotational position relative to the holding space by means of a corresponding sliding guide, having large tolerances, or the like, so that the leadthrough provided in the spacer sleeve is positively aligned with the corresponding bore in the housing of the steering mechanism during installation of the spacer sleeve.

Further details and features of the invention emerge from the claims. Furthermore, the invention is explained with further details in the following text using the drawing, said drawing showing a diagrammatic section through a steering mechanism, a steering angle sensor unit being assigned to the latter.

BRIEF DESCRIPTION OF THE DRAWINGS

The single drawing shows a diagrammatic section through a steering mechanism according to one embodiment of the invention.

The steering mechanism shown in the diagram is a component part of a rack and pinion steering system for automobiles and is not shown in terms of its connection to the steering wheel as a steering input means actuated by the driver. The parts of the steering system which are relevant to said connection are not the subject matter of the invention, and can be configured, for example, in accordance with DE 197 03 903 A1, FIG. 1, the connection between the steering wheel and steering mechanism being mechanical and comprising a steering spindle which ends in a steering spindle part 1 at the steering mechanism end, said steering spindle part 1 being configured as a pinion meshing with a rack 2 and being mounted on both sides of the pinion toothing 3 in the housing 4 of the steering mechanism denoted overall by 5. An in particular electric actuating drive can be contained (not shown) in the connection to the steering input means (likewise not shown), said actuating drive, as a servomotor actuating drive, assisting steering forces introduced via the steering input means or, in the context of a steer by wire steering system, converting the steering forces, which are introduced via the steering input means and transmitted by means of corresponding actuating signals, into corresponding steering forces. A possible torque transmitting connection to the steering spindle part 1 is indicated at 6.

The steering spindle part 1, which is configured as a pinion, is assigned mountings 7, 8 in the housing 4 on both sides of the pinion toothing 3, of which the mounting 7 on the input side is formed by a needle bearing and the mounting 8 at the end is formed by a roller bearing which is depicted as a ball bearing and by means of which the steering spindle part 1 is axially fixed in the housing 4. For this purpose, the outer ring 9 of the roller bearing, which forms the mounting 8, is clamped against a housing shoulder 10 by means of a spacer sleeve 11, the latter being acted on by a cover 12 which is inserted, as a screw cover, into the throughhole, which forms the holder for the steering spindle part, at the end remote from the input end, i.e. the end adjacent to the steering input means, of the steering mechanism housing 4.

The spacer sleeve 11 bridges a housing space 13, in which the nut 14 lies, the steering spindle part 1 being clamped against the inner ring 15 of the bearing 8 by means of said nut 14, the nut 14 being screwed onto the journal 16, which ends in the housing space 12, of the steering spindle part 1.

In the exemplary embodiment, the nut 14 is provided, in the manner of a cap nut, with a necklike extension 17, which projects beyond the end of the journal 16 and is configured as a holder for a permanent magnet 18, which lies in the housing space 13 in the case of a mounting 8 clamped axially against the steering mechanism housing 4 by means of the cover 12, specifically at a distance from the cover 12 which allows a sensor 19 which is sensitive to magnetic fields to be arranged between the cover 12 and magnet 18, said sensor 19 being configured, by way of example and preferably, as a Hall sensor. The sensor 19 is held in its position overlapping the magnet 18 by means of a sensor carrier 20 which comprises a plug-in pin 21 and a support plate 22 connected to the plug-in pin 21. The plug-in pin 21 passes through the steering spindle housing 4 radially in a matching bore 24 which is sealed off, for example, by means of the indicated annular seal 23 and lies congruently with a corresponding, radial leadthrough 25 in the spacer sleeve 11.

Said leadthrough 25 can be correspondingly overdimensioned relative to the plug-in pin 21, i.e. have large tolerances, and, with regard to making installation easier, it can be expedient to align the spacer sleeve 11, in relation to its leadthrough 25, on the bore 24 by means of a corresponding guide (not shown).

The support plate 22 is preferably clamped against a bearing surface 27 of the housing 4 by means of a screw connection 26 and is configured, for example, as a holder for further components, in particular components of an electronic unit connected downstream of the sensor 19.

The radial insertion and holding of the sensor 19 leads to a design of the steering mechanism 5 which is very compact in terms of length, the type of holding device for the permanent magnet 18 further simplifying the design and, in conjunction with the radial insertion and holding of the sensor 19, different installation positions being possible relative to the periphery of the housing 4, which permits good possibilities for adaptation to the respective structural conditions specific to the vehicle.

In a known manner, the rack 2 is clamped and supported in sprung fashion against the steering spindle part 1 (as shown at 28), the relevant domelike holder 29 forming no obstacle to arranging the sensor carrier 20 in the corresponding peripheral region of the housing 4, if the support plate 27 of said sensor carrier 20 is aligned or adapted.

What is claimed is:

1. A steering system for motor vehicles, in particular a rack and pinion steering system for automobiles, having a steering input means on the vehicle side, and a steering spindle part which is coupled to the steering input means, lies in a steering mechanism housing and is mounted on both sides with respect to the steering mechanism housing, one of the mounting being configured as a roller bearing which is clamped in axially with respect to the steering mechanism housing, a permanent magnet arranged at said steering spindle part which ends in a closed space of the steering mechanism housing, a stationary sensor which is sensitive to magnetic fields arranged opposite the permanent magnet and having an assigned sensor carrier which is to be connected on the outside to the steering mechanism housing, a roller bearing mounting which is axially clamped in provided at an end region, which bears the permanent magnet, of the steering spindle part and is fixed in position by means of a spacer sleeve, which, as an extension of the steering spindle part, is acted on axially by a cover, which closes the end of the housing chamber, said spacer sleeve having a radial leadthrough for the sensor carrier located radially to the sensor.

2. The steering system as claimed in claim 1, wherein the spacer sleeve is formed by a plug-in sleeve.

3. The steering system as claimed in claim 1 or 2, wherein the cover is screwed into a threaded region of the housing chamber.

4. The steering system as claimed in claim 1 or 2, wherein the radial leadthrough of the spacer sleeve is configured as a bore.

5. The steering system as claimed in claim 4, wherein the spacer sleeve to the steering mechanism housing is assigned a rotational securing means.

6. The steering system as claimed in claim 4, wherein the sensor carrier has a plug-in pin, which is held in a guide bore, corresponding to the leadthrough of the spacer sleeve, of the steering mechanism housing.

7. The steering system as claimed in claim 6, wherein the plug-in pin is arranged on a support plate.

8. The steering system as claimed in claim 7, wherein the support plate is assigned switching and/or evaluation electronics for the steering angle sensor.

9. The steering system as claimed in claim 8, wherein it is possible to clamp the support plate against a support surface of the steering mechanism housing.

10. The steering system as claimed in claim 1 or 2, wherein the cover and the spacer sleeve form a clamping unit which is configured, in particular, as an installation unit.

* * * * *